United States Patent
Kang

(10) Patent No.: US 7,515,928 B2
(45) Date of Patent: Apr. 7, 2009

(54) CELL SELECTING APPARATUS IN MOBILE COMMUNICATION TERMINAL AND METHOD THEREOF

(75) Inventor: Woo-Sok Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 626 days.

(21) Appl. No.: 11/265,411

(22) Filed: Nov. 1, 2005

(65) Prior Publication Data

US 2006/0094452 A1    May 4, 2006

(30) Foreign Application Priority Data

Nov. 3, 2004   (KR) ...................... 10-2004-0088960

(51) Int. Cl.
*H04Q 7/20* (2006.01)

(52) U.S. Cl. ..................... 455/525; 455/550.1; 455/513; 455/437; 370/331

(58) Field of Classification Search ... 455/432.1–432.3, 455/425, 436–444, 513, 515, 524–525, 226.1–226.3, 455/67.11–67.13, 550.1, 553.1; 370/331–347
See application file for complete search history.

(56) References Cited

U.S. PATENT DOCUMENTS

| | | | | |
|---|---|---|---|---|
| 5,673,307 A | * | 9/1997 | Holland et al. ............... | 455/436 |
| 5,862,190 A | * | 1/1999 | Schaffner ................... | 375/341 |
| 6,473,614 B1 | * | 10/2002 | Quensel et al. ............. | 455/436 |
| 6,505,042 B1 | * | 1/2003 | Hafiz ......................... | 455/434 |
| 2004/0043769 A1 | * | 3/2004 | Amerga et al. .............. | 455/437 |

FOREIGN PATENT DOCUMENTS

| | | |
|---|---|---|
| CN | 1304624 | 7/2001 |
| JP | 11150751 | 6/1999 |
| JP | 11205342 | 7/1999 |
| JP | 2000-050337 | 2/2000 |
| WO | WO 2004/021731 | 3/2004 |
| WO | WO 2004/040781 A2 | 5/2004 |

* cited by examiner

*Primary Examiner*—Kamran Afshar
(74) *Attorney, Agent, or Firm*—Lee, Hong, Degerman, Kang & Waimey

(57) ABSTRACT

The present invention provides a mobile communications terminal that may comprise: a transceiver to send and receive signals with a serving cell and one or more neighboring cells; a memory to store characteristic parameter values related to the signals; and a controller cooperating with the transceiver and the memory to perform the steps of, obtaining a difference value between a measured reception power quality value of the serving cell and a minimum reception power quality value of the serving cell; measuring an error rate of a reception quality of one or more messages received through a common channel during a certain time period; and performing further processing to determine cell section by using the measured error rate, if the obtained difference value is at or below a reference value.

The controller can perform the further processing by, calculating a ranking value of the serving cell and a ranking value of one or more neighboring cells using reception power quality values of the serving cell and of the neighboring cells; comparing the measured error rate with a threshold value, if the ranking value of a neighboring cell is found to be greater than the ranking value of the serving cell during the duration of a timer; and performing cell selection if the measured error rate is greater than the threshold value.

22 Claims, 3 Drawing Sheets

CELL SELECTING APPARATUS IN MOBILE COMMUNICATION TERMINAL AND METHOD THEREOF

CROSS REFERENCE TO RELATED APPLICATION

Pursuant to 35 U.S.C. §119(a), this application claims the benefit of earlier filing date and right of priority to Korean Application No. 10-2004-0088960, filed Nov. 3, 2004, the contents of which are hereby incorporated by reference herein in their entirety.

BACKGROUND OF THE INVENTION

1. Field of the Invention

The present invention relates to a mobile communication terminal, and more particularly, to a cell selecting apparatus for a mobile communication terminal capable of performing a cell selection by using a message transmitted through a channel, and a method thereof

2. Description of the Background Art

Generally, a wireless communication system provides various communication services comprising audio data and video data to a user by using a modulating technique such as code division multiple access (CDMA), time division multiple access (TDMA), or the like. The CDMA system provides at least one CDMA technique such as a TIA/EIA-95-B Mobile Station-Base Station Compatibility Standard for Dual-Mode Wideband Spread Spectrum Cellular System, the 3GPP ($3^{rd}$ Generation Partnership Project) standard or the like. A service area defined by one base station of the CDMA system is referred to as a cell. Since the cell can provide service to mobile communication terminals inside the cell area, a provider can provide service to a user anytime anywhere by overlapping a plurality of cells.

When the mobile communication terminal (hereinafter, referred to as 'mobile terminal') moves to another cell area, the mobile terminal and the system have to continuously provide service to the user. Accordingly, when the mobile terminal is in an idle state, a cell selection is performed, and when the mobile terminal is in a connected state, a handover is performed.

When the mobile terminal in an idle state moves between cells, the mobile terminal releases a connection to a current cell for service (a serving cell). Then, the mobile terminal performs a connection to a neighboring cell.

FIG. 1 is a flowchart showing a cell selecting method in a mobile communication terminal in accordance with the related art.

Referring to FIG. 1, the related cell selecting method is performed by the following formulas.

$$S_{qual} = Q_{qualmeas} - Q_{qualmin} \quad \text{formula (1)}$$

$$S_{qual} <= S_{reference} \quad \text{formula (2)}$$

In the formulas (1) and (2), the $Q_{qualmeas}$ denotes a reception power quality of a serving cell measured by the mobile terminal. As one example, the $Q_{qualmeas}$ includes an Ec/Io for denoting a ratio between a reception power of the serving cell and an interference signal. The $Q_{qualmin}$ denotes a minimum reception power quality of the serving cell for enabling the mobile terminal to continuously perform service. The $S_{reference}$ denotes a reference value used for connecting the mobile terminal to the neighboring cell, and is stored in the mobile terminal.

The mobile terminal that has calculated the reception power quality of the serving cell by the formulas (1) and (2), calculates a ranking of the serving cell, $RANK_s$ and a ranking of the neighboring cell, $RANK_n$.

$$RANK_s = Qmeas_{,s} + Qhyst_{,s} \quad \text{formula (3)}$$

$$RANK_n = Qmeas_{,n} + Qoffset_{s,n} \quad \text{formula (4)}$$

In the formulas (3) and (4), the $Qmeas_{,s}$ denotes a reception power quality of a serving cell measured by the mobile terminal, and the $Qmeas_{,n}$ denotes a reception power quality of a neighboring cell measured by the mobile terminal. The Qmeas can denote an Ec/Io measured by the mobile terminal or a received signal code power (RSCP) for indicating a power of a common pilot channel. The $Qhyst_{,s}$ denotes an offset value of a serving cell, and the $Qoffset_{s,n}$ denotes an offset value of a serving cell versus a neighboring cell.

In the related art cell selecting method, $S_{qual}$ is calculated and then is compared with $S_{reference}$. If the $S_{qual}$ is less than the $S_{reference}$, a ranking of a neighboring cell, $RANK_n$ and a ranking of a serving cell, $RANK_s$ are calculated and then are compared with each other. If the $RANK_n$ is greater than the $RANK_s$ for a certain time, the mobile terminal performs a cell selection from the serving cell to the neighboring cell.

However, the related art cell selecting method has the following disadvantages. First, in case that the neighboring cell has an excellent reception power quality, the mobile terminal performs unnecessary cell selection even if the mobile terminal is in a serviceable state. As the number of times that the mobile terminal performs unnecessary cell selection is increased, the battery consumption amount of the mobile terminal is increased undesirably.

In order to solve such problem, a method for comparing a pilot power of the serving cell with a preset reference value in a cell selecting process is disclosed in the U.S. patent application publication 2004/0043769. However, the method performs a cell selection only based on a received pilot power of the serving cell without considering substantial channel environments, thereby not allowing a precise cell selection to be performed.

BRIEF DESCRIPTION OF THE INVENTION

Therefore, an object of the present invention is to provide a cell selecting method in a mobile communication terminal capable of reducing a battery consumption amount of the mobile communication terminal by measuring an error rate of a message received through a reception channel, comparing the measured error rate with a threshold value stored in the mobile terminal, and then performing a cell selection.

To achieve these and other advantages and in accordance with the purpose of the present invention, as embodied and broadly described herein, there is provided a mobile communication terminal, comprising: an error rate measuring unit for measuring an error rate of a message for a certain time period; a checking unit for checking a size of the measured error rate and a size of a certain threshold value; and a controller for controlling a cell selection by using the error rate and the threshold value.

To achieve these and other advantages and in accordance with the purpose of the present invention, as embodied and broadly described herein, there is also provided a cell selecting method in a mobile communication terminal, the method comprising: measuring an error rate of a message for a certain time period, then storing it; comparing the stored error rate with a threshold value stored in a mobile communication terminal; and performing a cell selection, if the stored error rate is greater than the threshold value.

Preferably, the threshold value is used so that the mobile terminal may perform a connection to a neighboring cell, and is stored in the mobile terminal.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF INVENTION

Reference will now be made in detail to some embodiments of the present invention, examples of which are illustrated in the accompanying drawings.

Hereinafter, an exemplary embodiment of the present invention will be explained with reference to the attached drawings.

In the present invention, an error rate of a message transmitted to a mobile terminal through a common channel is measured, and then the measured error rate is compared with a reference value, thereby performing a cell selecting method.

In a code division multiple access method, a mobile terminal of an idle state is operated at a set position to periodically check a common channel. The common channel is a channel checked by a plurality of mobile terminals, and may include a broadcasting channel, a paging channel, etc. A base station transmits messages to a plurality of mobile terminals through the common channel, and the mobile terminals measure an error rate of a received signal by using the messages.

Figure 1:
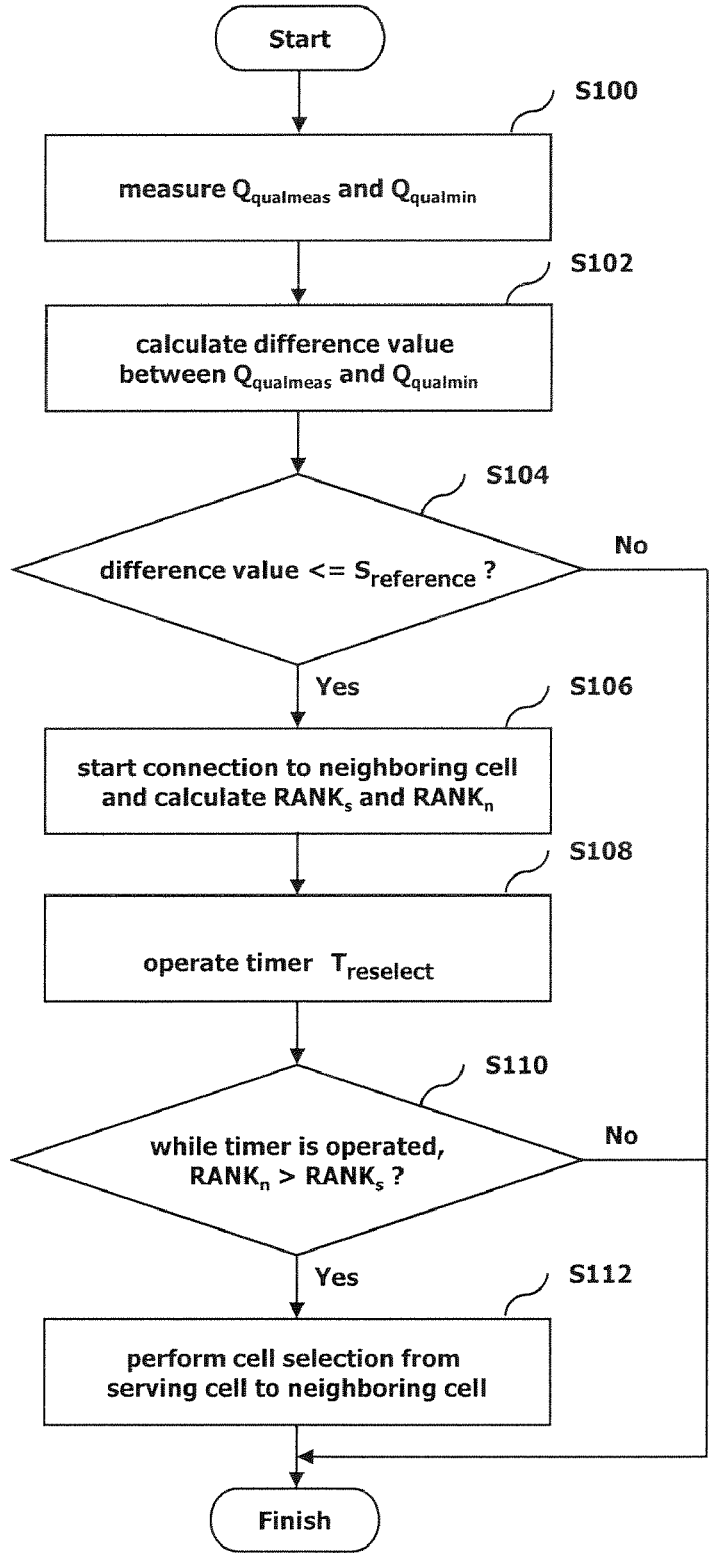
FIG. 1 is a flowchart showing an exemplary cell selecting method in a mobile communication terminal in accordance with the related art.
Figure 2:
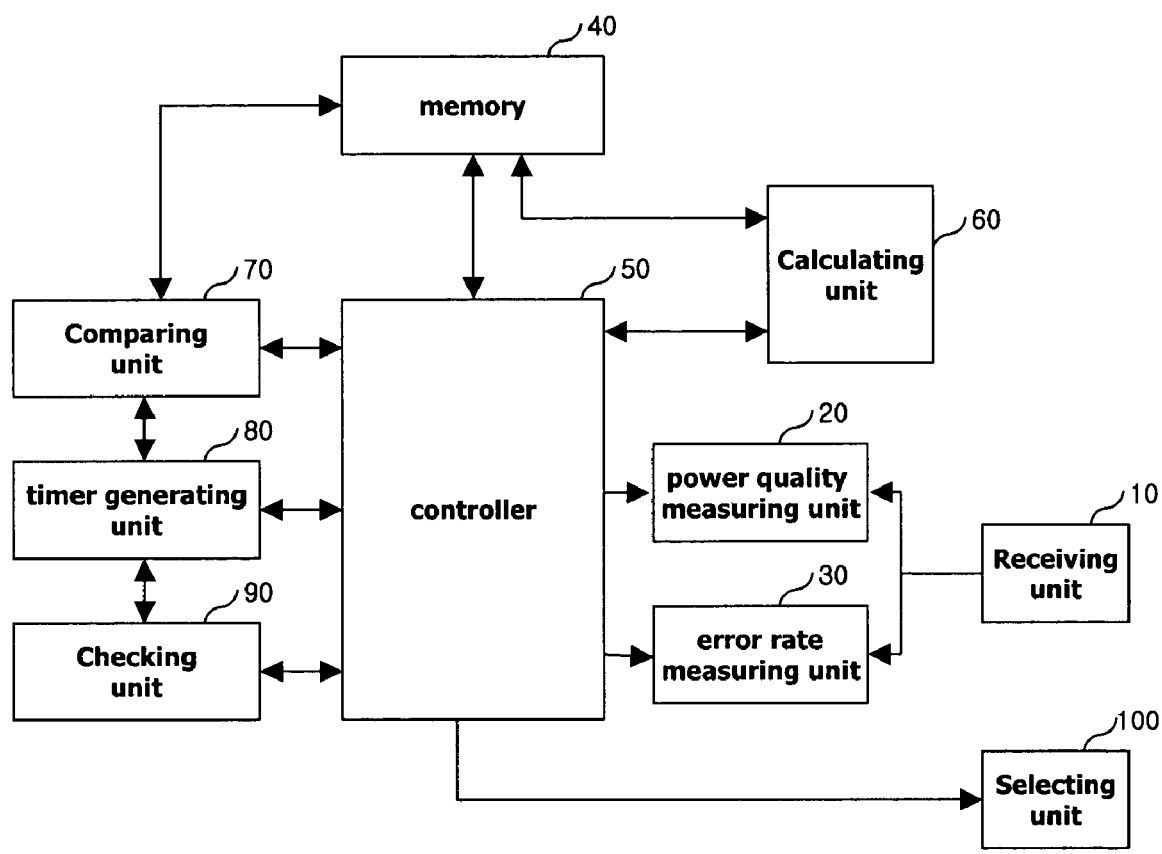
FIG. 2 is a block diagram showing a cell selecting apparatus in a mobile communication terminal according to the present invention.

FIG. 2 is a block diagram showing a cell selecting apparatus in a mobile communication terminal according to the present invention.

Referring to FIG. 2, the cell selecting apparatus in a mobile communication terminal comprises a receiving unit 10 for receiving a message through a channel of a serving cell and one or more neighboring cells, a power quality measuring unit 20 for measuring a reception power quality value of the serving cell and a minimum reception power quality value of the serving cell, an error rate measuring unit 30 for measuring an error rate of a reception quality of the channel; a calculating unit 60 for calculating a difference value between the values measured by the power quality measuring unit 20, and then comparing the difference value with a threshold value stored in the mobile communication terminal, a memory 40 for storing the result value calculated by the calculating unit 60, a comparing unit 70 for comparing a ranking value of the serving cell with a ranking value of the neighboring cell, a timer generating unit 80 for generating a timer, a checking unit 90 for checking whether the error rate of a message received through the channel exceeds a certain threshold value or not, if the ranking value of the serving cell is smaller than the ranking value of the neighboring cell, a selecting unit 100 for performing a cell selection according to the checked result, and a controller 50 for controlling the units and an entire function of the mobile communication terminal.

Hereinafter, an operation of the cell selecting apparatus in a mobile communication terminal according to the present invention will be explained with reference to FIG. 2.

When the mobile terminal is to move between cells by a cell selection, the mobile terminal measures a reception power quality value of a serving cell, $Q_{qualmeas}$, and a minimum reception power quality value of the serving cell, $Q_{qualmin}$ by the power quality measuring unit 20. Then, the measured values are stored in the memory 40 by the controller 50, and a difference value between the $Q_{qualmeas}$ and the $Q_{qualmin}$ is calculated by the calculating unit 60.

The error rate measuring unit 30 measures an error rate of a message received through a channel being served for a certain time period $T_{quality}$, and stores the measured error rate for reception quality in the memory 40. The certain time is a minimum time necessary to measure an error rate of a message, and can be varied according to a user or a manufacturing company.

Then, the calculating unit 60 calculates a difference value $S_{qual}$ between the $Q_{qualmeas}$ and $Q_{qualmin}$ measured by the power quality measuring unit ($S_{qual}=Q_{qualmeas}-Q_{qualmin}$), and then stores the difference value $S_{qual}$ in the memory 40. The calculating unit 60 compares the $S_{qual}$ with a reference value $S_{reference}$ stored in the mobile terminal.

The comparing unit 70 compares a ranking value of the serving cell $RANK_s$ and a ranking value of the neighboring cell $RANK_n$. When the comparison is completed, the timer generating unit 80 operates a timer and periodically compares the $RANK_s$ and the $RANK_n$ while the timer is operated. If the $RANK_n$ is greater than the $RANK_s$ for a certain time while the timer is operated, the checking unit 90 checks whether an error rate of a message transmitted through a reception channel exceeds a preset threshold value $Q_{threshold}$ stored in the mobile terminal. As the result, if the error rate exceeds the preset threshold value $Q_{threshold}$, the selecting unit 100 performs a cell selection from the serving cell to the neighboring cell.

According to another embodiment, the present invention provides a mobile communications terminal comprising a transceiver to send and receive signals with a serving cell and one or more neighboring cells, a memory to store characteristic parameter values related to the signals, and a controller cooperating with the transceiver and the memory to perform the steps of: obtaining a difference value between a measured reception power quality value of the serving cell and a minimum reception power quality value of the serving cell; measuring an error rate of a reception quality of one or more messages received through a common channel during a certain time period; and performing further processing to determine cell section by using the measured error rate, if the obtained difference value is at or below a reference value.

The controller can perform the further processing by, calculating a ranking value of the serving cell and a ranking value of one or more neighboring cells using reception power quality values of the serving cell and of the neighboring cells; comparing the measured error rate with a threshold value, if the ranking value of a neighboring cell is found to be greater than the ranking value of the serving cell during the duration of a timer; and performing cell selection if the measured error rate is greater than the threshold value.

Figure 3:
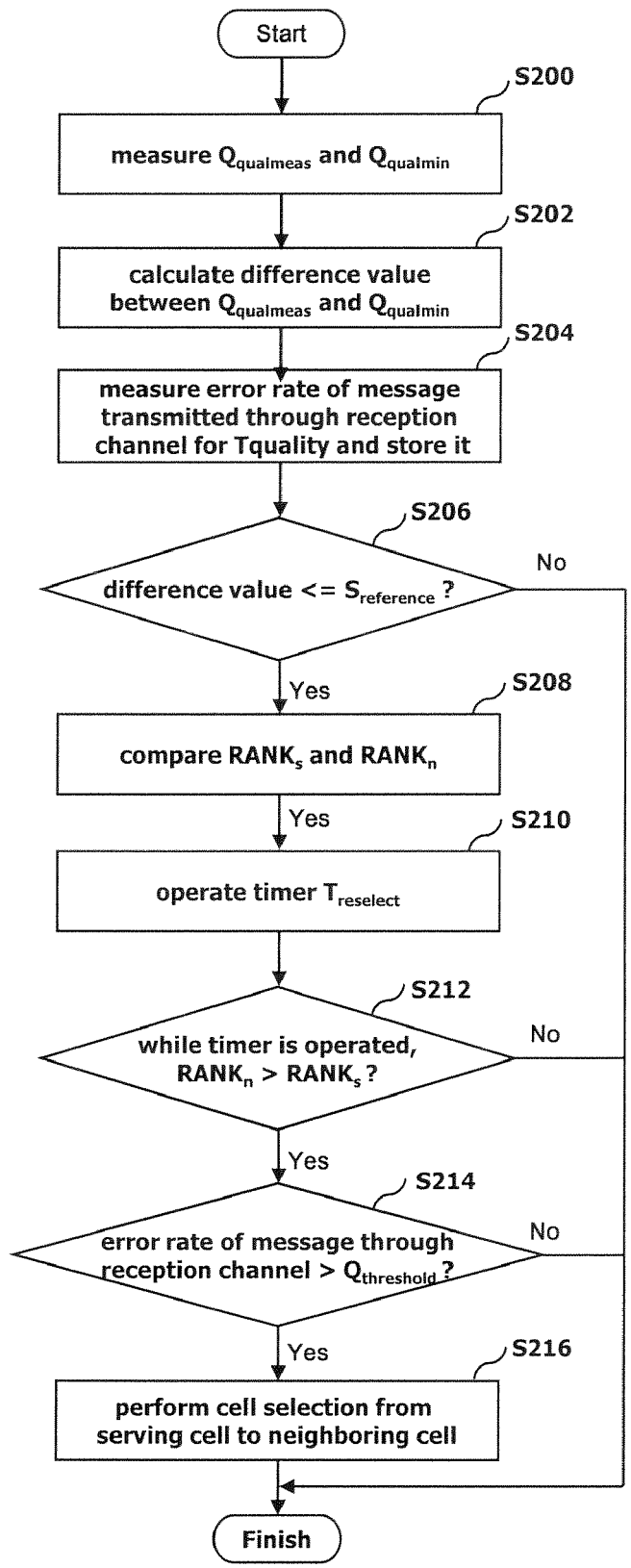
FIG. 3 is a flowchart showing an exemplary cell selecting method in a mobile communication terminal according to the present invention.

FIG. 3 is a flowchart showing an exemplary cell selecting method in a mobile communication terminal according to the present invention.

Hereinafter, the cell selecting method in a mobile communication terminal according to the present invention will be explained with reference to FIG. 3.

When the mobile terminal is to move between cells by a cell selection, the mobile terminal calculates a reception power quality value of a serving cell $Q_{qualmeas}$ and a minimum reception power quality value of the serving cell $Q_{qualmin}$ (S200). Then, the mobile terminal calculates a difference value $S_{qual}$ between the measured $Q_{qualmeas}$ and the $Q_{qualmin}$ (S202). Also, the mobile terminal measures an error rate of a reception quality of a message received through the common channel for $T_{quality}$, and then stores the measured reception quality in an inner memory (S204).

In step S206, the difference value $S_{qual}$ is compared with a variable reference value $S_{reference}$ stored in the mobile terminal so that the mobile terminal can perform a connection to a neighboring cell. If the $S_{qual}$ is less than or equal to the $S_{reference}$, the mobile terminal starts a connection to a neighboring cell, and then compares a ranking of a serving cell $RANK_s$ with a ranking of a neighboring cell $RANK_n$ (S206, S208). The $RANK_s$ is calculated by adding $Qmeas._s$ to $Qhyst._s$, in which $Qmeas._s$ denotes a reception power quality of a serving cell measured by the mobile terminal, and the $Qhyst._s$ denotes an offset value of the serving cell. The $RANK_n$ is calculated by deducting $Qoffset_{s,n}$ from $Qmeas._n$, in which the $Qmeas._n$ denotes a reception power quality of a neighboring cell measured by the mobile terminal, and the $Qoffset_{s,n}$ denotes an offset value of the serving cell versus the neighboring cell.

If the rank values $RANK_s$, $RANK_n$ are calculated, the mobile terminal operates a timer and periodically compares the $RANK_s$ with the $RANK_n$ while the timer is operated (S210, S212). In step S212, if the $RANK_n$ is greater than the $RANK_s$, the mobile terminal checks whether an error rate of a stored message transmitted through a reception channel exceeds a preset threshold value $Q_{threshold}$ (S214). As the result, if the error rate exceeds the preset threshold value $Q_{threshold}$, the mobile terminal performs a cell selection from the serving cell to the neighboring cell (S216).

As aforementioned, in the present invention, whether the $RANK_n$ is greater than the $RANK_s$ is determined for the $T_{reselect}$ by the timer. Then, if the $RANK_n$ is greater than the $RANK_s$, the mobile terminal checks whether an error of a message measured for the preset time $T_{quality}$ exceeds the preset threshold value $Q_{threshold}$. If the error rate exceeds the preset threshold value $Q_{threshold}$, the mobile terminal performs a cell selection from the serving cell to the neighboring cell.

Even if channel environments are changed, the mobile terminal can stably perform a service only if the reception quality of the common channel is constantly maintained. Accordingly, the error rate of a message can serve as a precise parameter for judging whether to perform a cell selection or not.

In the present invention, unnecessary cell selection is not performed at an interface between cells, thereby reducing a power consumption of the mobile terminal and prolonging an idle waiting time.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A mobile communication terminal, comprising:
   an error rate measuring unit for measuring an error rate of a message for a time period;
   a checking unit for checking a size of the measured error rate and a size of a threshold value; and
   a controller for controlling a cell selection depending on the measured error rate and the threshold value,
   wherein the controller determines cell section by
   calculating a ranking value of a serving cell and a ranking value of one or more neighboring cells using reception power quality values of the serving cell and of the one or more neighboring cells;
   comparing the measured error rate with the threshold value, if the ranking value of a neighboring cell of the one or more neighboring cells is greater than the ranking value of the serving cell during a duration of a timer; and
   performing the cell selection if the measured error rate is greater than the threshold value.

2. The terminal of claim 1, further comprising a memory for storing the measured error rate.

3. The terminal of claim 1, further comprising a power quality measuring unit for measuring a power quality of the serving cell.

4. The terminal of claim 1, wherein the controller performs the cell selection from the serving cell to the neighboring cell.

5. The terminal of claim 1, further comprising a calculating unit for calculating a difference value between a reception power quality of the serving cell and a minimum reception power quality of the serving cell for providing service to the terminal.

6. The terminal of claim 5, wherein the calculating unit compares the difference value with a reference value stored in the terminal for a connection between the terminal and the neighboring cell.

7. The terminal of claim 1, wherein the message is transmitted through a channel of a serving cell currently being served.

8. The terminal of claim 1, wherein the error rate comprises a signal to noise ratio.

9. The terminal of claim 1, wherein the time period is a minimum time necessary to measure the error rate of a message, and the time period can be varied.

10. The terminal of claim 6, wherein the reference value is variable.

11. A mobile communications terminal comprising:
    a transceiver to send and to receive signals with a serving cell and one or more neighboring cells;
    a memory to store characteristic parameter values related to the signals; and
    a controller cooperating with the transceiver and the memory to perform the steps of
    obtaining a difference value between a measured reception power quality of the serving cell and a minimum reception power quality of the serving cell;
    measuring an error rate of a reception quality of one or more messages received through a common channel during a time period; and
    performing further processing to determine cell section by using the measured error rate, if the obtained difference value is less than or equal to a reference value, wherein the controller performs the further processing by
calculating a ranking value of the serving cell and a ranking value of one or more neighboring cells using reception power quality values of the serving cell and of the one or more neighboring cells;
comparing the measured error rate with a threshold value, if the ranking value of a neighboring cell of the one or more neighboring cells is greater than the ranking value of the serving cell during a duration of a timer; and
performing cell selection if the measured error rate is greater than the threshold value.

12. A cell selecting method in a mobile communication terminal, the method comprising:
calculating a ranking value of a serving cell and a ranking value of one or more neighboring cells using reception power quality values of the serving cell and of the one or more neighboring cells;
measuring an error rate of a message for a time period and storing the measured error rate;
comparing the stored error rate with a threshold value, if the ranking value of a neighboring cell of the one or more neighboring cells is greater than the ranking value of the serving cell during a duration of a timer;
performing a cell selection if the stored error rate is greater than the threshold value.

13. The method of claim 12, wherein the message is transmitted through a channel of a serving cell.

14. The method of claim 12, wherein the error rate comprises a signal to noise ratio.

15. The method of claim 12, wherein the error rate is measured for the time period provided by a timer.

16. The method of claim 12, wherein the threshold value is stored in the mobile communication terminal.

17. A cell selecting method in a mobile communication terminal, the method comprising:
calculating a difference value between a reception power quality of a serving cell and a minimum reception power quality of the serving cell;
measuring an error rate of a message transmitted from a channel of the serving cell for a first time period and storing the measured error rate;
comparing the calculated difference value with a reference value stored in the mobile communication terminal;
calculating a ranking value of the serving cell and a ranking value of a neighboring cell using reception power quality values of the serving cell and of the neighboring cell and then comparing the ranking value of the serving cell to the ranking value of the neighboring cell for a second time period, if the difference value is less than or equal to the reference value;
comparing the stored error rate with a threshold value, if the ranking value of the neighboring cell is greater than the ranking value of the serving cell during a duration of a timer; and
performing a cell selection if the ranking value of the neighboring cell is greater than the ranking value of the serving cell and the stored error rate is greater than the threshold value.

18. The method of claim 17, wherein the serving cell channel is a channel for providing service to the mobile communication terminal by a base station.

19. The method of claim 17, wherein the message is transmitted through the channel.

20. The method of claim 17, wherein the error rate comprises a signal to noise ratio.

21. The method of claim 17, wherein the error rate is measured for the first time period provided by a timer.

22. The method of claim 17, wherein the threshold value is stored in the mobile communication terminal.

* * * * *